(12) United States Patent
Vachaparampil et al.

(10) Patent No.: US 11,475,627 B2
(45) Date of Patent: Oct. 18, 2022

(54) METHOD OF OBTAINING 3D MODEL DATA OF A PLURALITY OF COMPONENTS OF AN OBJECT

(71) Applicant: CARESOFT GLOBAL HOLDINGS LIMITED, Essex (GB)

(72) Inventors: Mathew Vachaparampil, Essex (GB); Madasamy Paneerselvam, Essex (GB); Sangeeth Athiannan, Essex (GB); Mohamed Abbas Ali, Essex (GB); Johnson Jebadas, Essex (GB)

(73) Assignee: CARESOFT GLOBAL HOLDINGS LIMITED, Essex (GB)

( * ) Notice: Subject to any disclaimer, the term of this patent is extended or adjusted under 35 U.S.C. 154(b) by 198 days.

(21) Appl. No.: 16/476,678

(22) PCT Filed: Jan. 9, 2018

(86) PCT No.: PCT/GB2018/050050
§ 371 (c)(1),
(2) Date: Jul. 9, 2019

(87) PCT Pub. No.: WO2018/127715
PCT Pub. Date: Jul. 12, 2018

(65) Prior Publication Data
US 2021/0142556 A1    May 13, 2021

(30) Foreign Application Priority Data

Jan. 9, 2017    (GB) .................................... 1700352

(51) Int. Cl.
*G06T 17/00*    (2006.01)
(52) U.S. Cl.
CPC .......... *G06T 17/00* (2013.01); *G06T 2200/04* (2013.01); *G06T 2200/08* (2013.01)

(58) Field of Classification Search
CPC ... G06T 17/00; G06T 7/0012; G06T 2200/04; G06T 2200/08
See application file for complete search history.

(56) References Cited

U.S. PATENT DOCUMENTS

| 10,217,217 | B2 * | 2/2019 | Dhruwdas | ............. G06T 7/0012 |
| 2016/0042554 | A1 * | 2/2016 | Ogan | .................. H04N 13/395 |
| | | | | 345/419 |

(Continued)

FOREIGN PATENT DOCUMENTS

| WO | 2009/078415 A1 | 6/2009 |
| WO | 2017/146930 A1 | 8/2017 |

OTHER PUBLICATIONS

International Search Report and Written Opinion of the International Searching Authority dated Apr. 10, 2018 in corresponding International application No. PCT/GB2018/050050; 12 pages.

(Continued)

*Primary Examiner* — Said Broome
(74) *Attorney, Agent, or Firm* — Maier & Maier, PLLC (57) ABSTRACT

A method including obtaining x-ray data for a multi-component object; processing the x-ray data to obtain at least first and second 3D representations of the object with respective first and second resolutions, the first resolution being higher than the second resolution; identifying a plurality of regions of the second 3D representation, each region corresponding to one of a number of components of the object, by at least identifying a number of initial regions of the second 3D representation, each initial region having pixel values in one of a plurality of ranges of pixel values, and adjusting each of the number of initial regions based on a comparison between the initial region and features derived from 2D sections of the object from the first 3D representation; and obtaining a 3D model.

18 Claims, 10 Drawing Sheets

(56) References Cited

U.S. PATENT DOCUMENTS

2016/0091439 A1   3/2016  O'Hare
2019/0069857 A1*  3/2019  Kanemaru ........... A61B 6/4266

OTHER PUBLICATIONS

Anonymous, "Castings, Computed tomography in the casting industry", Oct. 31, 2008, p. 1-5; URL:https://4nsi.com/application-studies/castings; retrieved on Mar. 29, 2018; 5 pages.

Search Report dated Nov. 3, 2017 in corresponding British application No. 1700352.6; 3 pages.

* cited by examiner

METHOD OF OBTAINING 3D MODEL DATA OF A PLURALITY OF COMPONENTS OF AN OBJECT

FIELD

The present application relates among other things to methods and systems for obtaining three-dimensional (3D) model data of a plurality of components of an object such as a motor vehicle.

BACKGROUND

There is considerable interest in (competitive) assessment/benchmarking of complex objects such as motor vehicles, which may include, for example, more than 10,000 components.

Such objects may be physically disassembled, but this is usually destructive, requires significant manual work, and the disassembly process loses information about, for example, the 3D arrangement of components.

X-ray computed tomography (CT) systems are commonly used to analyse individual components or relatively small numbers thereof, e.g. to detect cracks, etc. However, the use of such systems to effectively analyse complete complex objects such as motor vehicles has been prevented, at least in part, by significant difficulties with processing the data involved.

SUMMARY

According to a first aspect of the present invention, there is provided a method comprising:
  obtaining x-ray data for a multi-component object;
  processing the x-ray data to obtain at least first and second (pixel-based) 3D representations of the object with respective first and second resolutions, the first (e.g. "high") resolution being higher than the second (e.g. "medium") resolution;
  identifying a plurality of regions of the second 3D representation, each region corresponding to one of a plurality of components of the object, by at least:
  identifying a plurality of initial regions of the second (medium-resolution) 3D representation, each initial region having pixel values in one of a plurality of ranges of pixel values (or equivalent); and
  selectively adjusting each of the plurality of initial regions based on a comparison between the initial region and one or more features (e.g. edges) derived from one or more 2D sections of at least part of the object obtained from the first (high-resolution) 3D representation; and
  obtaining, for each of the plurality of components, a 3D model (e.g. a CAD model) of the component based on a corresponding region and/or based on one or more features (e.g. dimensions) derived from one or more 2D sections of at least part of the object obtained from the first (high-resolution) 3D representation.

Thus, the method may provide an effective and efficient way of assessing complex products such as motor vehicles.

The method may further comprise:
  assembling the 3D models of the plurality of components to obtain a component-resolved 3D model of the object.

The method may comprise:
  dividing the first and second 3D representations into a plurality of working regions (e.g. corresponding to subassemblies of the object); and
  identifying the plurality of regions in each of the plurality of working regions.

The method may comprise:
  dividing the first and second 3D representations based on a third 3D representation of the object with a third (e.g. "low") resolution lower than the second resolution.

The processing of the x-ray data may comprise stepwisely increasing the resolution and wherein the first (high-resolution) representation is obtained at a later step than the second (medium-resolution) representation, etc.

The identifying of each of the plurality of initial regions may comprise determining a range of pixel values related to a particular material in the object (e.g. a particular steel, etc.).

The method may comprise:
  determining a plane for each of the one or more 2D sections;
  determining each of the one or more 2D sections; and
  deriving one or more features from each of the one or more 2D sections.

At least one plane may correspond to a midplane of a subassembly of the object.

The deriving of one or more features from each of the one or more 2D sections may comprise deriving vector graphics from the 2D section.

The one or more features may comprise:
  edges and/or areas of components in a 2D section; and/or
  dimensions of components in a 2D section.

The selective adjusting of each of the plurality of initial regions may comprise determining if the initial region comprises two or more components. Determining if the initial region comprises two or more components may comprise determining if the initial region crosses any edges and/or occupies any two or more areas.

The selective adjusting of each of the plurality of initial regions may comprise selectively dividing the initial region into two or more intermediate regions or regions. The dividing may be based on edges and/or areas.

The obtaining of the 3D model of each of the plurality of components may comprise:
  determining if the component corresponds to a component of a first type; and
  responsive to a positive determination, obtaining the 3D model of the component based on:
    a predetermined 3D model for the component of the first type; and
    one or more dimensions of the component obtained from the one or more 2D sections.

The obtaining of the 3D model of each of the plurality of components may comprise:
  converting the first 3D representation into an intermediate 3D model (e.g. an STL model), wherein the intermediate 3D model corresponds to a mesh model.

The obtaining of the 3D model of each of the plurality of components may comprise:
  determining if the component corresponds to a component of a second type; and
  responsive to a positive determination, converting the intermediate 3D model (STL model) to the 3D model (CAD model) of the component.

The x-ray data may be obtained using at least x-rays with an energy of about 9 MeV. The plurality of components in the object may correspond to at least 10,000 components.

According to a further aspect of the present invention, there is provided a computer program for performing the method.

According to a further aspect of the present invention, there is provided a data structure comprising a component-resolved 3D model of an object obtained by performing the method.

According to a further aspect of the present invention, there is provided a non-transitory computer-readable medium comprising the computer program and/or the data structure.

According to a further aspect of the present invention, there is provided a computer system configured to perform the method. The computer system may comprise at least one processor and at least one memory comprising computer program code, the at least one memory and the computer program code configured to, with the at least one processor, cause the computer system to perform the method. There may be provided a system comprising: apparatus configured to provide x-ray data; and the computer system configured to obtain the x-ray data.

BRIEF DESCRIPTION OF THE DRAWINGS

Certain embodiments of the present invention will now be described, by way of example, with reference to the accompanying drawings, in which.

DETAILED DESCRIPTION

System

Figure 1:
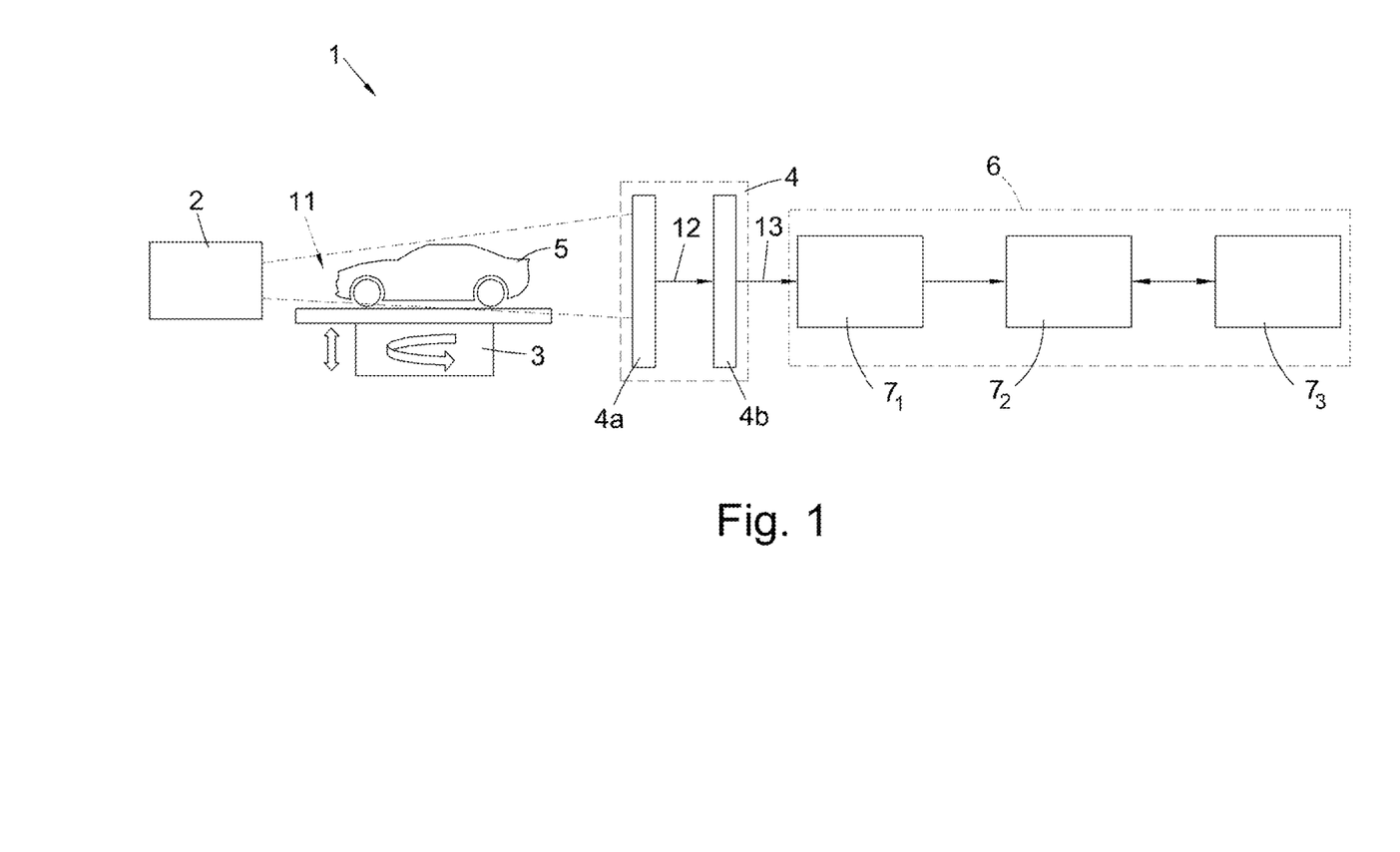
FIG. 1 illustrates a system for obtaining 3D model data of a plurality of components of an object.

Referring to FIG. 1, a system 1 will now be described. As will be explained, the system 1 may be used to obtain component-resolved 3D model data of complex objects.

The system 1 is configured to perform x-ray CT scanning. The system 1 includes an x-ray source 2, a computer-controlled turntable 3 and a detector 4. A test object 5 such as a motor vehicle can be placed on the turntable 3.

The system 1 also includes a computer system 6, which includes a first device $7_1$, a second device $7_2$, and one or more third devices $7_3$ (hereinafter referred to as image capturing, image reconstruction and 3D modelling devices, respectively).

The source 2 is configured to produce x-ray radiation 11 which is directed towards the object 5. In some examples, the x-ray radiation 11 has energies of up to at least 9 MeV. In some examples, the system 1 is configured to perform cone beam CT scanning in which the X-rays 11 are divergent and form a cone.

The turn-table 3 at least is operatively connected to, and operates under control of, the image capturing device $7_1$.

The detector 4 includes a scintillator 4a and a linear diode array 4b. The scintillator 4a receives x-ray radiation 11 that has interacted with the object 5. The scintillator 4a converts received x-ray radiation 11 into visible light 12. Each of the diodes in the array 4b may receive visible light 12 and, in response thereto, produce an electrical (voltage) signal. The electrical signals from the diodes in the array 4b are amplified, multiplexed and converted to a digital signal 13. The digital signal 13 is provided to the computer system 6.

Devices

Figure 2:
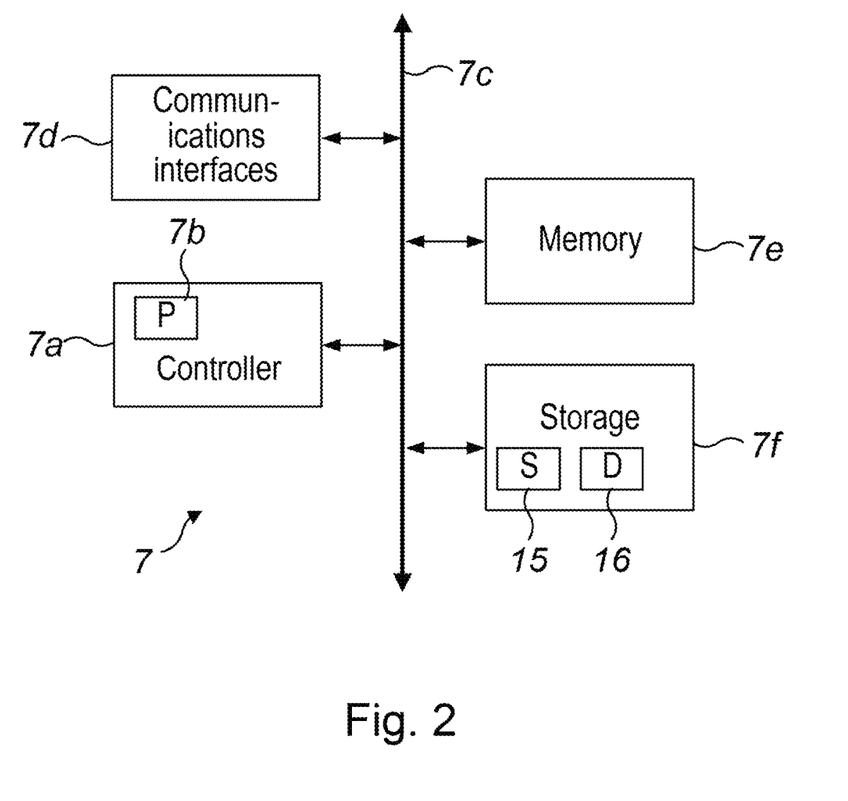
FIG. 2 illustrates a computing device which may form part of the system of FIG. 2.

Referring to FIG. 2, the image capturing, image reconstruction and 3D modelling devices $7_1$, $7_2$, $7_3$ will now be described in more detail. Each of the devices $7_1$, $7_2$, $7_3$ are similar and in this paragraph are referred to as simply the device 7. The device 7 includes a controller 7a which includes one or more processors 7b (denoted by "P" in FIG. 2). The controller 7a communicates with other components 7d-7f of the device 7 via a system bus 7c. The device 7 includes one or more communications interfaces 7d (e.g. an Ethernet interface) for communicating e.g. with the other devices. The device 7 includes memory 7e including volatile memory, e.g. RAM, and non-volatile memory, e.g. ROM. The volatile memory is used by the controller 7a for the temporary storage of data, for instance when controlling the operation of other components of the device 7 or moving data between components. The device 7 includes storage 7f, e.g. solid state and/or hard disk storage. The storage 7f stores, among other things, computer-readable instructions or software ("S") 15 and data ("D") 16 used by the software 4, including data relating to the object 5. In some instances, the device 7 may include one or more user interfaces (not shown) to enable the device to receive inputs from, and provide outputs to, users.

The software 15 is configured to perform the method described below. As will be appreciated, the steps of the method may be fully automated or they may be partly automated and may also involve certain user interactions. Steps may utilise known algorithms to obtain the results. Steps may utilise known machine learning/artificial neural network techniques to obtain the results.

Method

Figure 3:
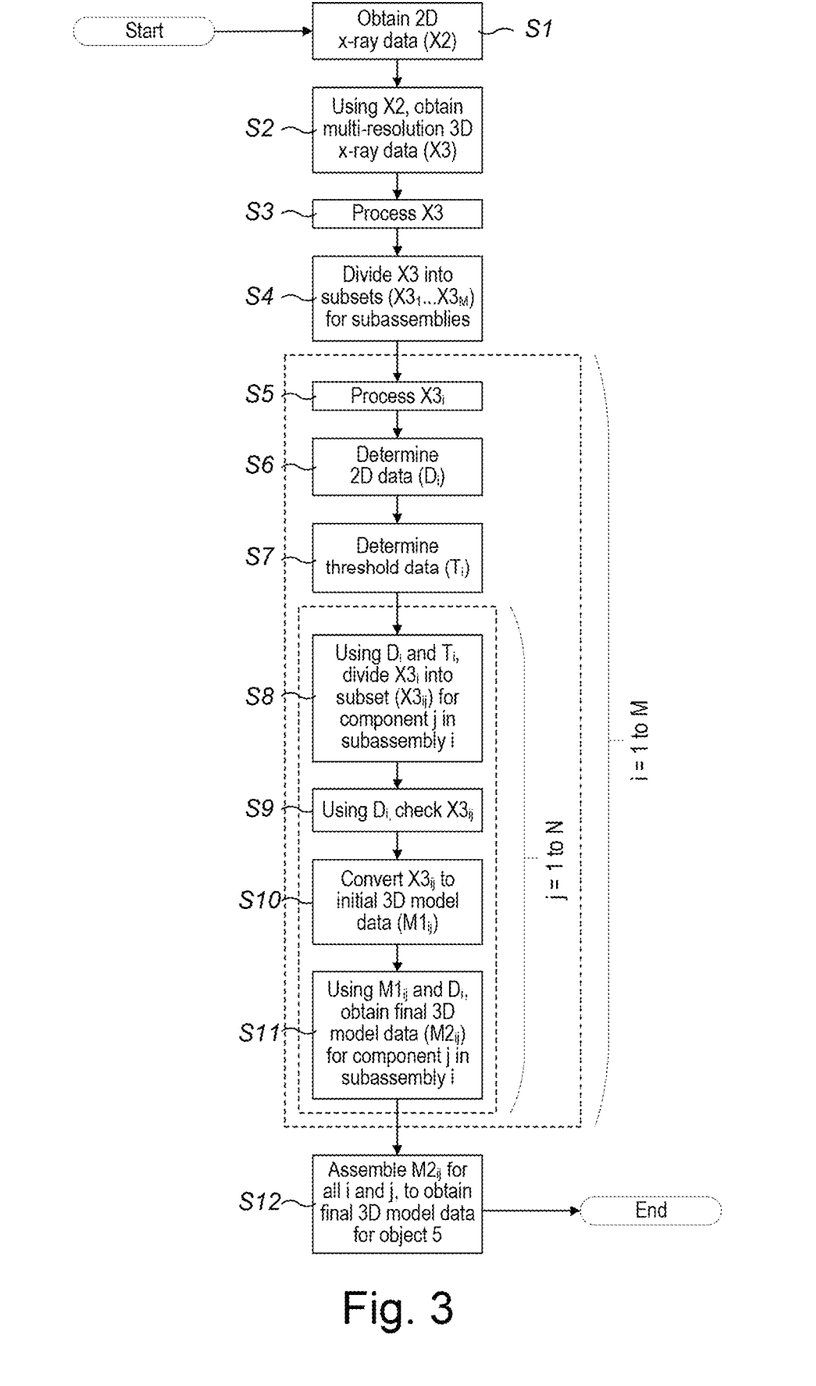
FIG. 3 illustrates a method which may be carried out by the system of FIG. 1.
Figure 4:
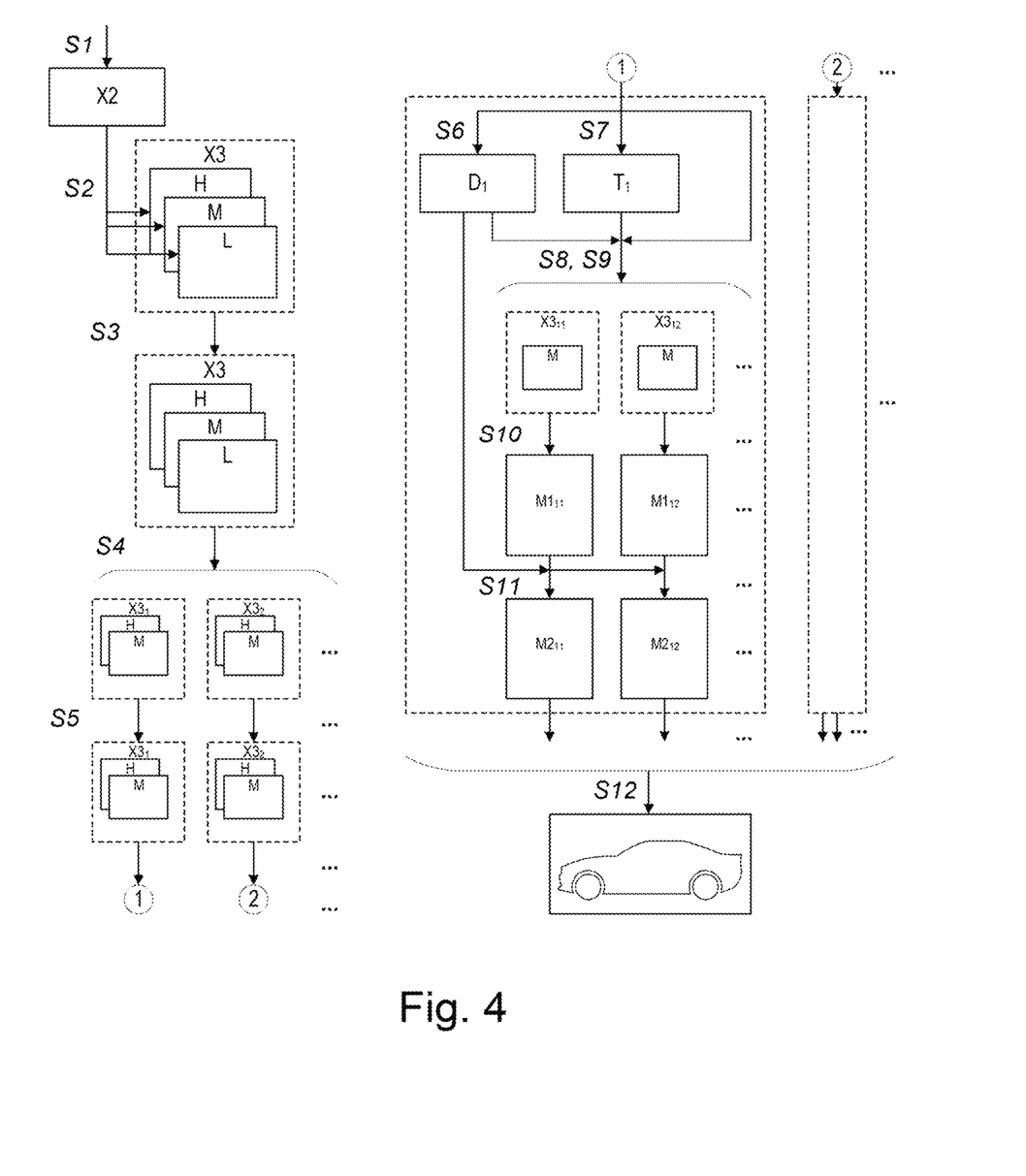
FIG. 4 illustrates data flow associated with the method of FIG. 3.

Referring to FIGS. 3 and 4, a method which may be performed by the system 1 will now be described. FIG. 3 corresponds to a process flow diagram, and FIG. 4 corresponds to a data flow diagram.

First Step

At a first step S1, two-dimensional (2D) x-ray data is obtained (denoted by "X2" in FIGS. 3 and 4).

The object 5 is placed on the turntable 3 and rotated around a single axis of rotation while a series of 2D x-ray images is obtained.

In order to maintain regular image geometry, the rate of rotation of the turntable 3 is synchronized with the line exposure time of the detector 4. Rates of rotation may correspond to linear velocities in the range from 0.005 to 0.01 metres per second. Regions with denser materials (e.g. high-strength materials), regions with greater numbers of different components with different densities, regions with more complex components, etc. may be imaged at slower rates of rotation. In this way, a greater density of 2D x-ray images is obtained, which may be helpful in identifying such details.

The first step S1 is carried out by, or under control of, the image capturing device $7_1$.

Second Step

At a second step S2, the 2D x-ray data is used, i.e. processed, to obtain multi-resolution 3D x-ray data ("X3").

The second step S2 (or image reconstruction) involves using, for example:

Fourier domain reconstruction algorithms e.g. as described in S. Smith, "The Scientist and Engineer's Guide to Digital Signal Processing", California Technical Pub (1997), Ch. 25;

Fresnel algorithms e.g. as described in M. Liebling and M. Unser "Comparing algorithms for reconstructing digital off-axis Fresnel holograms", Proc. SPIE 6016, Three-Dimensional TV, Video, and Display IV, 60160M (Nov. 15, 2005); doi:10.1117/12.631039.

In contrast to the typical single-stage process, image reconstruction is carried out in three stages, resulting in 3D x-ray data with three different resolutions (hereinafter called low-resolution, medium-resolution, and high-resolution). In particular, the 2D x-ray data is initially processed using the algorithms to obtain low-resolution 3D x-ray data. The data is then subject to more processing to obtain medium-resolution data 3D x-ray data. The data is then subject to even more processing to obtain high-resolution data.

The 3D x-ray data obtained at the second step S2 thus includes high- ("H"), medium- ("M") and low- ("L") resolution 3D images of the object 5.

Each 3D image correspond to a 3D grids of 3D pixels (or, in other words, voxels) and/or a set of 2D images (hereinafter referred to as slices) corresponding to different slices through the object 5.

As will be explained in more detail below, there is a value associated with each pixel/voxel (hereinafter referred to as a pixel value), which relates to the x-ray attenuation of the corresponding region of the object 5 and hence relates to any material in that region. The pixel value may be represented visually by a greyscale intensity.

Resolution may correspond to a dimension of a pixel/voxel. The low-resolution 3D x-ray data has a typical resolution of about 1,000 micrometres (μm), medium-resolution about 600 μm, and high-resolution about 150 μm. However, one or more of the resolutions may differ from these typical values. For example, the resolutions may be in the ranges >750 μm (low-resolution), 350-750 μm (medium resolution), and <350 μm (high-resolution).

Figure 5:
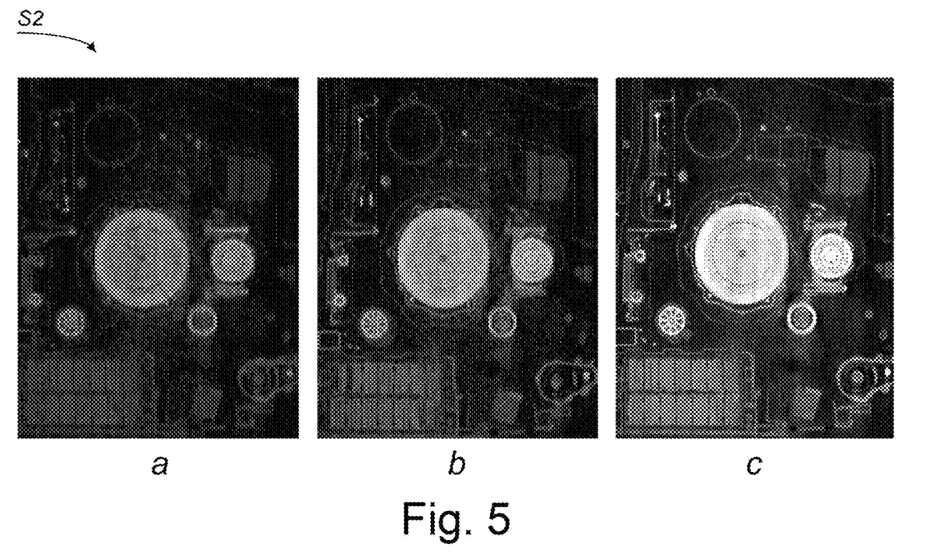
FIG. 5 illustrates slices of low-resolution (a), medium-resolution (b), and high-resolution (c) 3D x-ray data which may be obtained at a second step of the method of FIG. 3.

Referring in this paragraph to FIG. 5, example slices of low-resolution 3D x-ray data (a), medium-resolution 3D x-ray data (b) and high-resolution 3D x-ray data (c) are shown.

As will be explained in more detail below, the low-resolution data is used for data processing operations relating to 3D images of the whole of the object 5. The low-resolution data is particularly suited for such operations because it is relatively small. For a typical object 5, the low-resolution data has a size of about 200 gigabytes (GB), the medium-resolution data has a size of about 600 GB and the high-resolution data has a size of about 1,000 GB.

The medium-resolution data has lower noise than the high-resolution data. Thus, using the medium-resolution data rather than the high-resolution data to obtain the initial 3D model data (see below) leads to there being fewer erroneous mesh elements caused by noise. This in turn facilitates accurate capturing of the features of the object 5. Thus, the medium-resolution data is used for obtaining the initial 3D model data, while the high-resolution data is used for obtaining e.g. edge data, dimensional data, etc. (see below).

The 3D x-ray data is preferably stored, transferred, etc. in a Digital Imaging and Communications in Medicine (DICOM) form. Although other formats may be used, the DICOM has several advantages, e.g. relating to ease of data manipulation.

The second step S2 is carried out by the image reconstruction device $7_2$.

Third Step

At a third step S3, the multi-resolution 3D x-ray data is processed. This preferably involves using known algorithms to sharpen the images, reduce artifacts in the images (e.g. caused by beam hardening), improve contrast of the images, etc.

The third step S3, and subsequent steps S4 . . . S12, are carried out by the 3D modelling devices $7_3$.

Fourth Step

At a fourth step S4, the 3D x-ray data is divided into a plurality of subsets ("$X3_1$ . . . $X3_M$").

Figure 6:
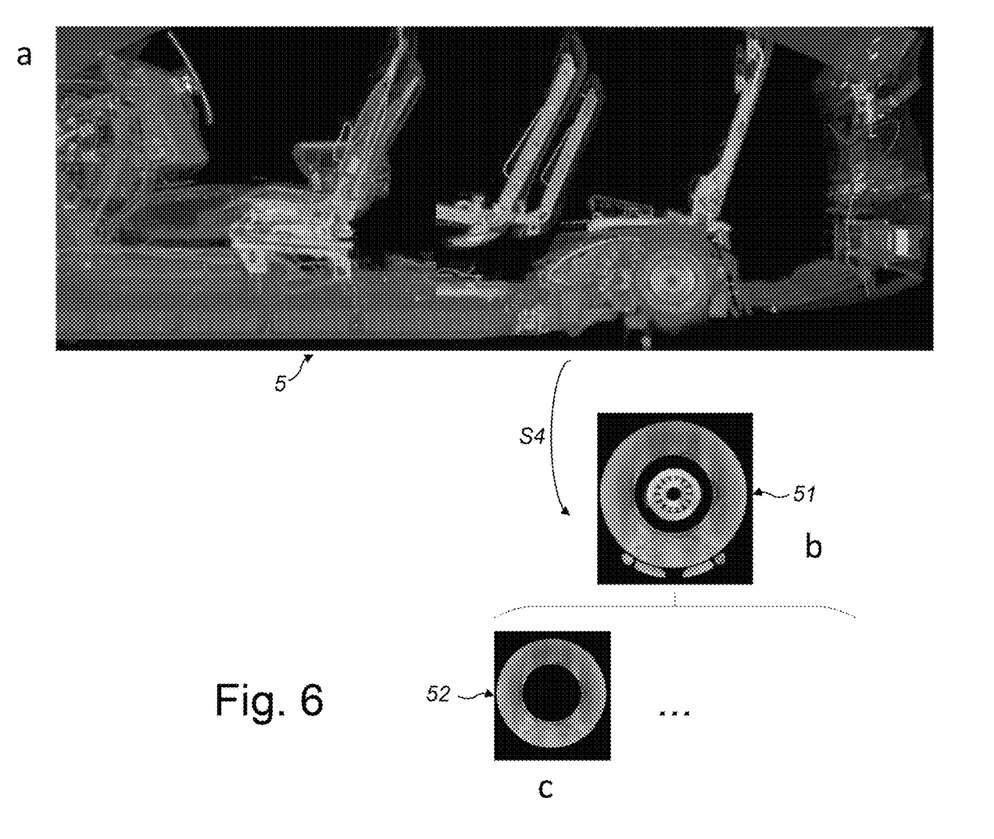
FIG. 6 illustrates slices of 3D x-ray data for an object (a), a subassembly (b) and a component (c). The 3D x-ray data for the subassembly may be obtained at a fourth step of the method of FIG. 3.

Referring in this paragraph to FIG. 6, a typical object 5 includes a plurality (e.g. several hundreds or more) of subassemblies or equivalent, and each subassembly includes a plurality (e.g. several tens or more) of components. Accordingly, a typical object 5 includes over 10,000 components, as mentioned above. By way of example, a motor vehicle 5 includes a corner module 51 as one of its subassemblies, and the corner module 51 includes a disc pad 52 as one of its components.

Each of the plurality of subsets preferably corresponds to a different one of the subassemblies in the object 5. However, the 3D x-ray data may be divided in any suitable way, with each subset preferably including a plurality (e.g. several tens or more) of components.

The fourth step S4 preferably involves selecting a plurality of 3D regions, each of which includes a different one of the subassemblies of the object 5. Such a 3D region may be cuboid or may have any other suitable shape (e.g. cylindrical). Two or more of the plurality of 3D regions may overlap each other.

The fourth step S4 is preferably carried out using the low-resolution x-ray data for the whole of the object 5. It may be performed in any suitable way, e.g. based on connectivity, predetermined rules, etc.

Each of the 3D regions will typically include ("additional") parts of the object 5 which are not in the relevant subassembly. These additional parts are preferably ignored when processing the relevant subset.

Each subset preferably includes medium- and high-resolution (i.e. not low-resolution) 3D-x-ray data.

The fourth step S4 allows the processing involved in obtaining final 3D model data (i.e. CAD data) for the plurality of subassemblies to be performed in parallel. It also facilitates accurate capturing of the features of the object 5 because each subassembly has a level of complexity which is particularly suitable for the processing described herein.

Whenever data is divided (e.g. in steps S4 and S8) or changed from one type to another (e.g. in steps S6, S10 and S11), data describing positions of relevant elements (voxels, lines/curves, surfaces, etc.) are suitably maintained, e.g. based on a global coordinate system (or equivalent). Among other things, this facilitates subsequent (re-)assembly of the data.

Fifth Step

The fifth to eleventh steps S5-S11 of the method are carried out for each subset/corresponding subassembly (referred to as simply the subset and the subassembly, respectively, in the following). This may be done in parallel, as mentioned above.

At a fifth step S5, the subset ("$X3_1$") is processed in a similar way to the third step S3. In this case, the processing may be optimized for the specific subset. For example, 3D image quality may be improved in complex areas such as press fit components, welded components, bolted components, etc.

Sixth Step

At a sixth step S6, 2D data ("$D_i$") relating to the subassembly is obtained.

Figure 7:
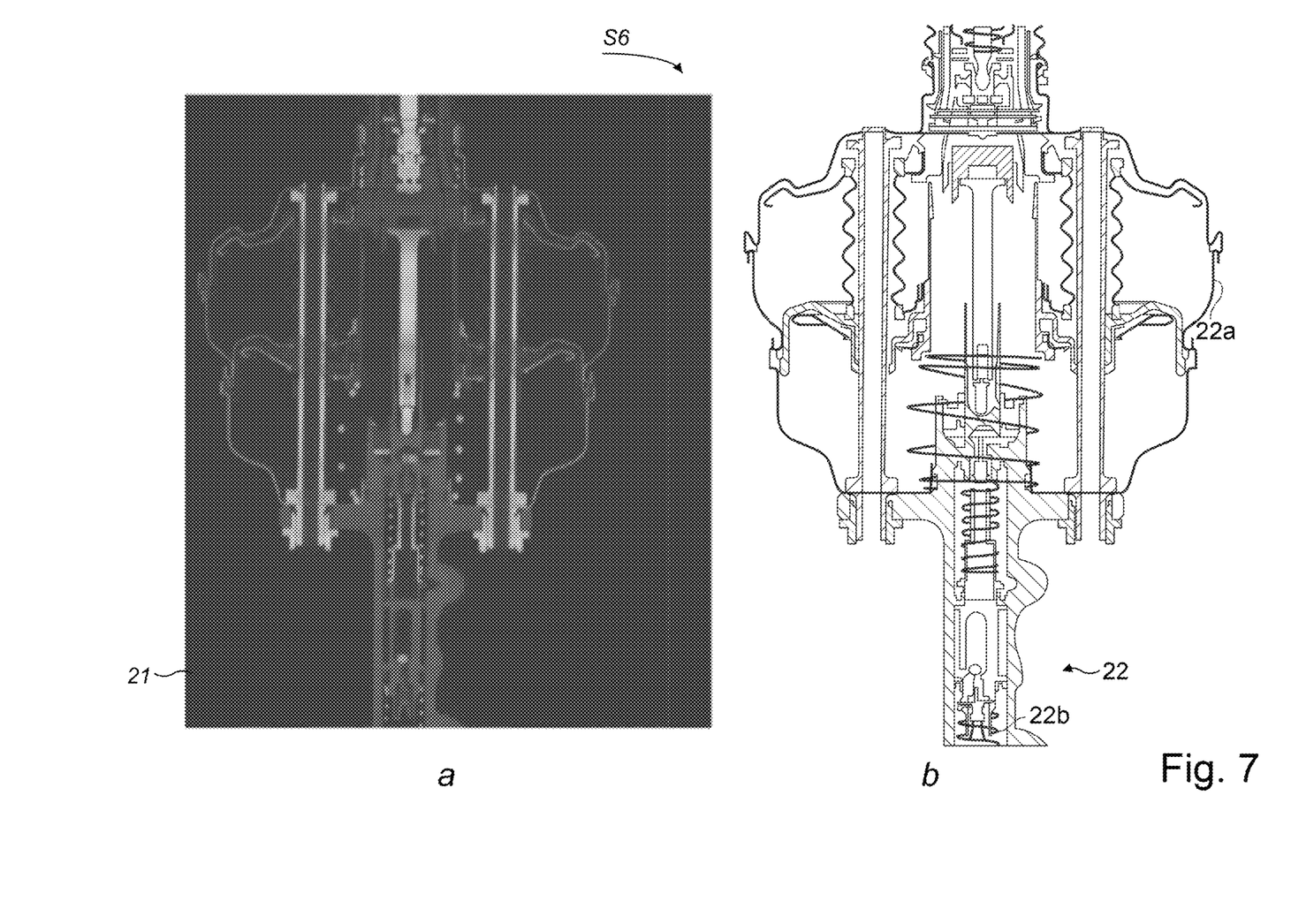
FIG. 7 illustrates a 2D image of a subassembly (a) and corresponding edge and area data for the subassembly (b) which may be obtained at a sixth step of the method of FIG. 3.

Referring in this paragraph to FIG. 7(a), the sixth step S6 involves obtaining a 2D image 21 of the subassembly from the high-resolution 3D x-ray data in the subset. The 2D image 21 corresponds to a (cross-)section of the subassembly. The plane defining the section may be determined in any suitable way. For example, the plane may be a midplane of the subassembly, e.g. dividing the subassembly into two substantially symmetrical parts.

Referring in this paragraph to FIG. 7(b), the sixth step S6 then involves determining the 2D data 22. This involves determining a set of lines/curves 22a (hereinafter referred to as edge data) corresponding to the edges of the features of the subassembly (e.g. components) in the 2D image 21. The edge data 22a may be determined in any suitable way, e.g. using edge detection algorithms. The nature of lines/curves may also be constrained in certain ways, e.g. to form closed loops. Preferably, determining the 2D data 22 also involves identifying a set of areas 22b (hereinafter referred to as area data) defined by, e.g. bounded by, the edge data 22a. Preferably, separate areas are determined as corresponding to the same component where appropriate. This may be performed in any suitable way, e.g. based on similarity/symmetry, predetermined rules, etc.

Figure 8:
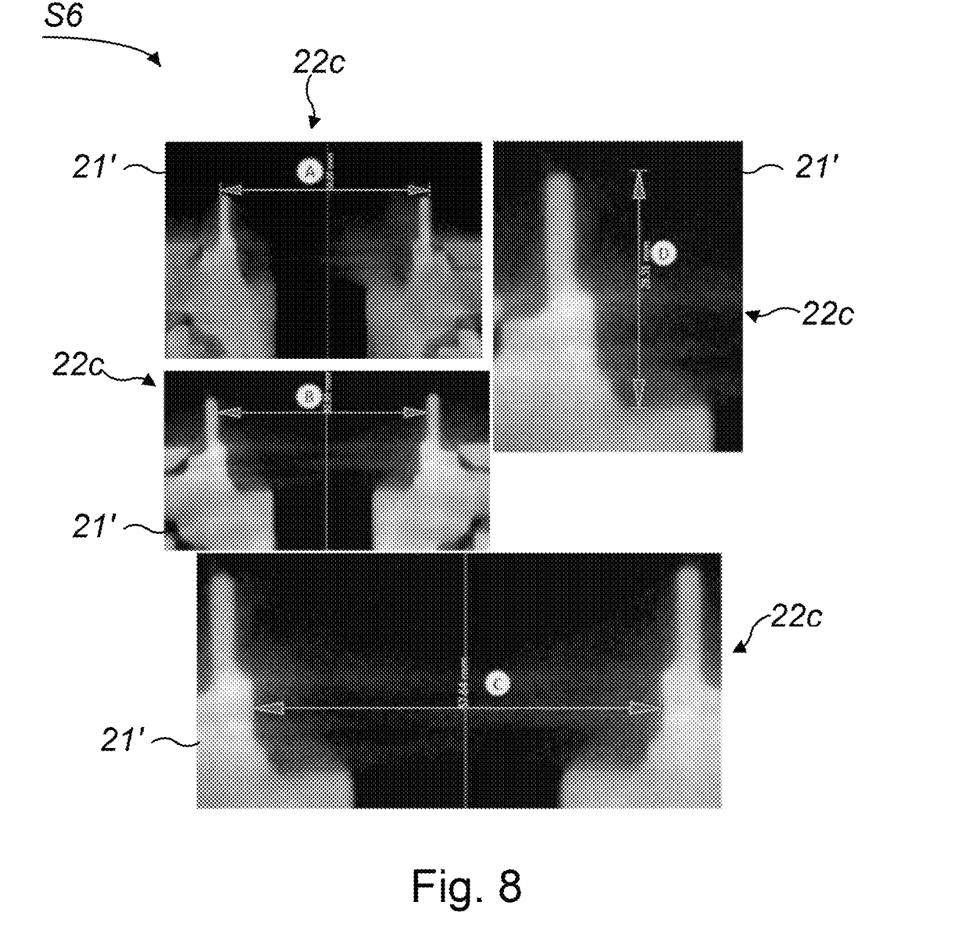
FIG. 8 illustrates dimensional data which may be obtained at the sixth step of the method of FIG. 3.

Referring in this paragraph to FIG. 8, the sixth step S6 also involves determining a set of dimensions 22c (hereinafter referred to as dimensional data) of the features of the subassembly (e.g. components) in the 2D image 21'. This may be performed in any suitable way. For example, dimensional data 22c may be derived from line/curve parameters included in the edge data 22a. Dimensional data 22c may include distances between parallel edges, etc.

The 2D data 22 may be determined for a single 2D image 21 (i.e. a single cross-section) or for multiple 2D images 21 (i.e. multiple cross-sections).

The 2D data is sometimes referred to herein as features.

Seventh Step

The seventh and eighth steps S7, S8 are carried out in relation to the medium-resolution x-ray data in the subset, i.e. the medium-resolution 3D image of the subassembly.

At the seventh step S7, a plurality of pairs of thresholds ("$T_i$") are determined. The plurality of pairs of thresholds are hereinafter referred to as threshold data.

Each pair of thresholds preferably correspond to an upper-limit and a lower-limit of a range of greyscale intensities. A greyscale intensity corresponds (according to a particular mapping) to a pixel value and hence relate to the material in the region associated with a pixel. The following materials will typically have the following pixel values (in Hounsfield units, HU):

Steel: 12 to 18 HU
Aluminium: 25 to 35 HU
Plastic: 72 to 81 HU

Different components of the object 5 will generally be made of different materials and so have greyscale intensities/pixel values in different ranges. Even when different components are made of nominally the same material, there may still be detectable differences in the greyscale intensities/pixel values due to slight differences between the materials.

If each of the components in the subassembly is associated with a distinct (i.e. different and non-overlapping) range of greyscale intensities, then, by determining suitable pairs of thresholds, each of the components in the subassembly may be separately selected. However, in some instances, it may only be possible to determine pairs of thresholds corresponding to two or more components.

This may be particularly significant with e.g. press-fit components, snap-fit components, weldments, and other such connected components.

The threshold data is preferably determined so as to enable the maximum number of components to be separately selected. The threshold data may be determined in any suitable way. For example, the thresholds may be determined based on a distribution (histogram) of greyscale intensities in the 3D image of the subassembly. As will be explained in more detail below, initial threshold data may also be adjusted based on the 2D data 22.

Figure 9:
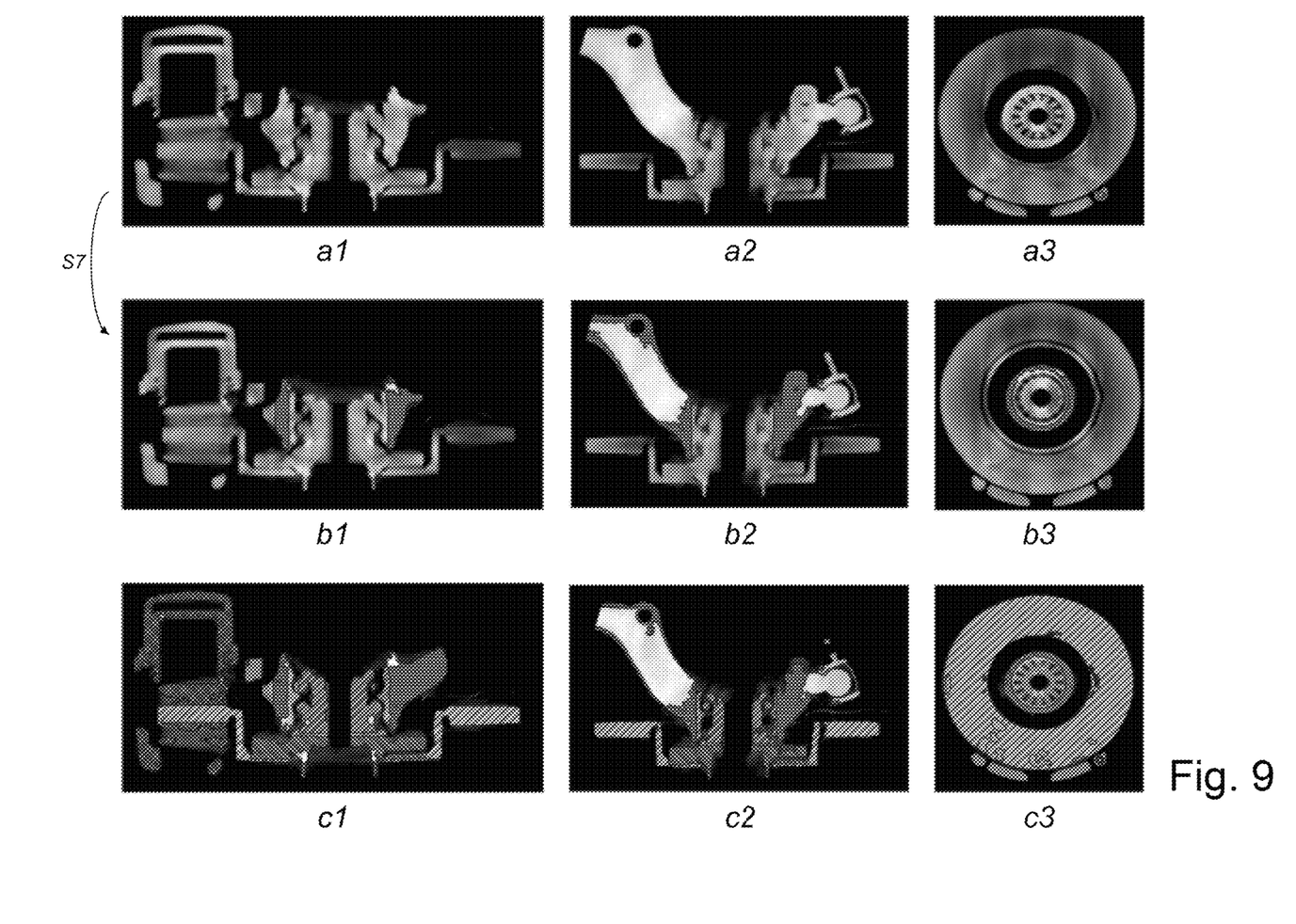
FIG. 9 illustrates orthogonal slices of a subassembly (a1, a2, a3), the subassembly with one component selected based on thresholds which may be determined at a seventh step of the method of FIG. 3 (b1, b2, b3), and the subassembly with five different components selected (c1, c2, c3).

Referring in this paragraph to FIG. 9, a set of three orthogonal slices (a1, a2, a3) of a 3D image of an example subassembly (a corner module) is shown. The next three slices (b1, b2, b3) show a threshold-based selection one of the components (a knuckle). The next three slices (c1, c2, c3) show five different threshold-based selections of five different component(s).

Eighth Step

The eighth to eleventh steps S8-S11 of the method are carried out for each component in the subassembly (referred to as simply the component in the following).

At the eight step S8, the subset is divided into a further subset ("$X3_{ij}$"). The further subset includes 3D x-ray data for the component and is hereinafter referred to as a component subset.

The eighth step S8 involves using a particular pair of thresholds to divide the subset into an initial subset which may include a component or a group of components.

The eighth step S8 then involves selectively dividing the initial subset using the 2D data 22. This involves determining whether the initial subset includes more than one component. This may be performed in any suitable way. For example, the edge data 22a and/or area data 22b may be compared with a suitable slice of the 3D x-ray data to determine whether there is significant material crossing an edge or occupying two areas. In response to a positive determination, the initial subset is divided. This may be performed in any suitable way, e.g. based on relevant curves/lines in the edge data 22a, suitably propagated to three dimensions.

The threshold data may (globally or locally) adjusted in view of the 2D data 22.

Initial subsets corresponding to two unconnected 3D regions may be divided in a straightforward manner.

Accordingly, at the eighth step S8, a component subset, i.e. including 3D x-ray data for one component, is obtained.

Ninth Step

At a ninth step S9, the component subset is checked. This preferably involves determining one or more errors by comparing the 2D data 22 (e.g. area data 22b and/or dimensional data 22c) with features of a suitable slice of the component subset. If the error exceeds a maximum acceptable error, then the method preferably returns to the previous step S8, which is repeated using different parameters.

Tenth Step

At a tenth step S10, the 3D x-ray data in the component subset is converted to initial 3D model data ("$M1_{ij}$").

The initial 3D model data preferably corresponds to Stereolithography (STL) data and is hereinafter referred to as simply STL data. STL data describes a set of triangular surfaces, which may be used to define one or more closed triangular mesh surfaces and hence one or more 3D objects bounded by those surfaces.

The 3D x-ray data in the component subset is converted to STL data using known techniques.

The method also preferably involves a step (not shown) at which the STL data is processed, e.g. to refine meshes, remove erroneous mesh elements, etc.

Figure 10:
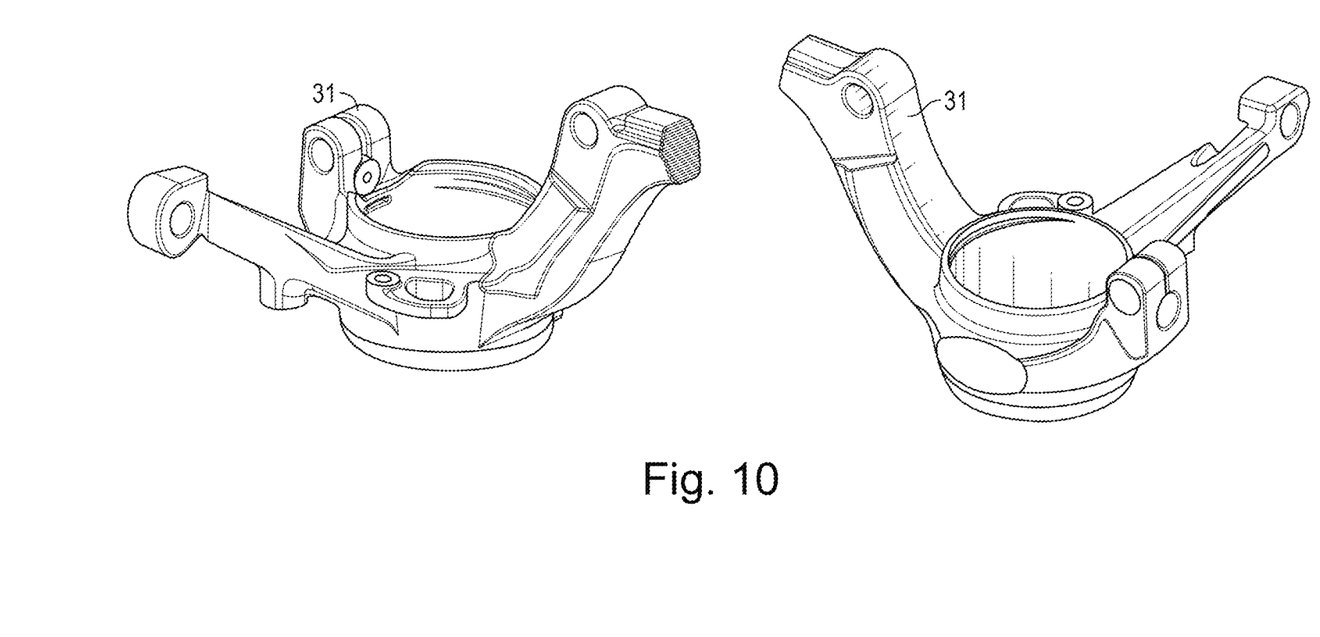
FIG. 10 illustrates, from two different perspectives, initial 3D model data for a component. which may be obtained at a tenth step of the method of FIG. 3.

Referring in this paragraph to FIG. 10, STL data for a component (i.e. a knuckle) is shown by way of example.

Eleventh Step

At an eleventh step S11, final 3D model data ("$M2_{ij}$") for the component is obtained.

This is performed using the STL data obtained at the previous step S10 and 2D data 22 obtained at the sixth step S6.

The final 3D model data preferably corresponds to computed-aided design (CAD) data and is hereinafter referred to as simply CAD data. The CAD data preferably uses boundary representation to represent a solid (e.g. a component) as a collection of connected surface elements. These surface elements are represented precisely, e.g. using non-uniform rational Basis splines (NURBSs) (c.f. the STL data).

The eleventh step S11 preferably involves determining whether the component is of a first type or of a second type:

The first type includes standard components such as bolts and so forth. The first type may also include components with relatively simple features. For example, component $62_9$ shown in FIG. 11 (i.e. a hub) is generally cylindrical symmetrical with a relatively simple cross section.

Figure 11:
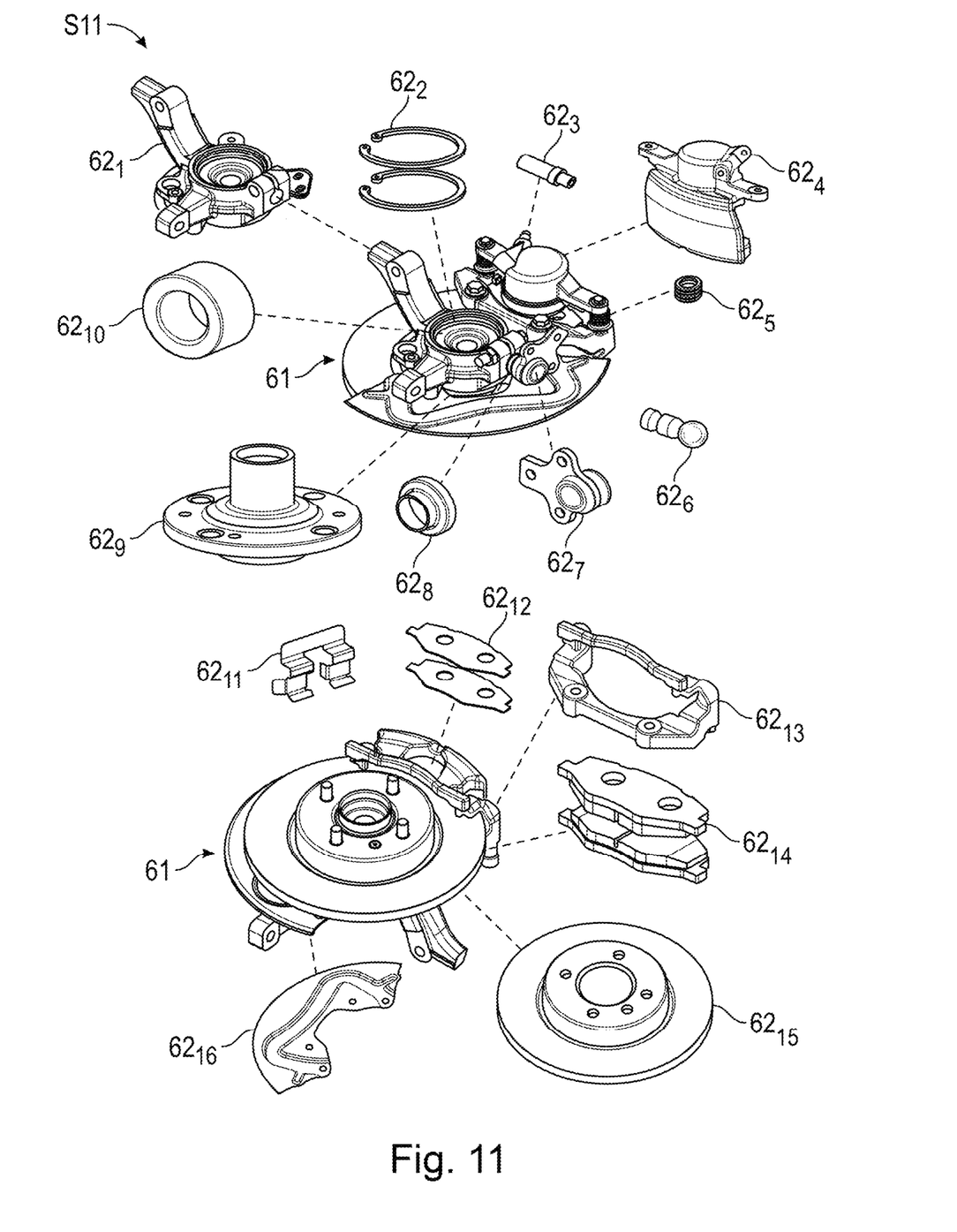
FIG. 11 illustrates final 3D model data for a plurality of components, each of which may be obtained at an eleventh step of the method of FIG. 3. Also illustrated, from two different perspectives, is a subassembly of the components.

Components of the second type are nonstandard and/or relatively complex, such as component $62_1$ shown in FIG. 11 (i.e. a knuckle).

The determination may be made based on whether or not the STL data matches any stored data representing components of the first type (hereinafter referred to as standard components).

If the component is of the first type, then the CAD data is obtained primarily from the 2D data 22. For example, a particular standard component may be created from a stored generic model, e.g. using a relatively small number of parameters (e.g. dimensions), which may be obtained from the dimensional data 22c.

If the component is of the second type, then the CAD data is obtained using the STL data and the 2D data 22. In particular, a set of surfaces (e.g. NURBS surfaces) is created on the surface of the component represented by the STL data. At least some of the dimensions of these surfaces are preferably then adjusted using the dimensional data 22c.

As mentioned above, the preceding step S11 (and others) is carried out in relation to each subassembly in the object 5 and each component in each subassembly. Accordingly, CAD data for each of the components in the object 5 is obtained.

Referring in this paragraph to FIG. 11, CAD data for a plurality of different components $62_1, \ldots 62_{16}$ of a subassembly 61 (i.e. a corner module) is shown by way of example.

Twelfth Step

At a twelfth step S12, the CAD data for each of the components in the object 5 is assembled, thereby obtaining CAD data for the object 5.

As mentioned above, when the data was divided, etc., data describing positions of relevant elements was suitably maintained, thereby facilitating the assembly. Nevertheless, more steps may be needed. For example, because of the separate processing for different subassemblies, the accurate reconnection of the subassemblies may require further operations, e.g. based on common reference points, etc.

Overview

Referring in particular to FIG. 4, some of the steps and features of the method are:

obtaining x-ray data (X2) for a multi-component object;

processing the x-ray data (X2) to obtain at least first and second 3D representations (X3-H, X3-M) of the object with respective first (H) and second (M) resolutions, the first resolution (H) being higher than the second resolution (M);

identifying a plurality of regions ($X3_{11}, X3_{12}, \ldots$) of the second 3D representation (X3-M), each region ($X3_{11}, X3_{12}, \ldots$) corresponding to one of a plurality of components of the object, by at least:

identifying a plurality of initial regions of the second 3D representation (X3-M), each initial region having pixel values in one of a plurality of ranges ($T_i$) of pixel values; and selectively adjusting each of the plurality of initial regions based on a comparison between the initial region and one or more features ($D_j$) derived from one or more 2D sections of at least part of the object obtained from the first 3D representation (X3-H); and obtaining, for each of the plurality of components, a 3D model ($M2_{11}, M2_{12}, \ldots$) of the component based on a corresponding region ($X3_{11}, X3_{12}, \ldots$) and/or based on one or more features ($D_j$) derived from one or more 2D sections of at least part of the object obtained from the first 3D representation (X3-H).

Other Modifications

It will be appreciated that many other modifications may be made to the abovedescribed embodiments.

For example, the computer system 6 may differ and, for example, there may be any number of computing devices, each of which may be as described above in relation to FIG. 2 or may be a cloud computing system, a computer cluster, etc. The computer system 6 may work together to perform the method in any suitable way. Data may be moved through, and stored in, the computer system 6 in any suitable way.

The multi-resolution 3D x-ray data may comprise fewer (i.e. two) different resolutions. For example, the subsets may be obtained without using the low-resolution data. The multi-resolution 3D x-ray data may comprise a greater number of different resolutions. For example, certain steps of the method and/or certain components may benefit from using resolutions that are different from those described above. For example, ultra-high resolution data may be beneficial in certain instances.

The method may comprise fewer steps. For example, some or all of the third, fourth, fifth. ninth, eleventh and twelfth steps S3, S4, S5, S9, S11, S12 may be omitted. The method may comprise additional steps, e.g. additional processing or checking steps.

Rather than pairs of thresholds defining single ranges, sets of thresholds defining multiple ranges could be used to select a single component.

Rather than dividing the 3D x-ray data into component subsets and then converting these into STL data, the 3D x-ray data (e.g. for a subassembly) may be converted into STL data and then the STL data may be divided.

The method may merely be for obtaining the initial 3D model (e.g. STL) data, i.e. not the final 3D model (e.g. CAD) data.

The invention claimed is:

1. A method for obtaining modeling data, comprising:
    obtaining x-ray data for a multi-component object;
    processing the x-ray data to obtain a first 3D representation of the object with a first resolution;
    processing the x-ray data to obtain a second 3D representation of the object with a second resolutions, the first resolution being higher than the second resolution;
    dividing the first and second 3D representations into a plurality of working regions;
    identifying a plurality of regions in each of the plurality of workings regions of the second 3D representation, each region corresponding to one of a plurality of components of the object, by at least:
    identifying a plurality of initial regions of the second 3D representation, each initial region having pixel values in one of a plurality of ranges of pixel values; and
    selectively adjusting each of the plurality of initial regions based on a comparison between the initial region and one or more features derived from one or more 2D sections of at least part of the object obtained from the first 3D representation;
    obtaining, for each of the plurality of components, a 3D model of the component based on a corresponding region and/or based on one or more features derived from one or more 2D sections of at least part of the object obtained from the first 3D representation; and
    assembling the 3D models of the plurality of components to obtain a component-resolved 3D model of the object.

2. A method for obtaining modeling data according to claim 1, comprising:
    dividing the first and second 3D representations based on a third 3D representation of the object with a third resolution lower than the second resolution.

3. A method for obtaining modeling data according to claim 1, wherein the processing of the x-ray data comprises stepwisely increasing the resolution and wherein the first representation is obtained at a later step than the second representation.

4. A method for obtaining modeling data according to claim 1, wherein the identifying of each of the plurality of initial regions comprises
    determining a range of pixel values related to a particular material in the object.

5. A method for obtaining modeling data according to claim 1, comprising:
    determining a plane for each of the one or more 2D sections;
    determining each of the one or more 2D sections; and
    deriving one or more features from each of the one or more 2D sections.

6. A method for obtaining modeling data according to claim 5, wherein at least one plane corresponds to a mid-plane of a subassembly of the object.

7. A method for obtaining modeling data according to claim 5, wherein the deriving of one or more features from each of the one or more 2D sections comprises
    deriving vector graphics from the one or more 2D sections.

8. A method for obtaining modeling data according to claim 1, wherein the one or more features comprise:
    edges and/or areas of components in the one or more 2D sections; and/or
    dimensions of components in the one or more 2D sections.

9. A method for obtaining modeling data according to claim 8, wherein the selective adjusting of each of the plurality of initial regions comprises
    determining if the initial region comprises two or more components.

10. A method for obtaining modeling data according to claim 9, wherein determining if the initial region comprises two or more components comprises
    determining if the initial region crosses any edges and/or occupies any two or more areas.

11. A method for obtaining modeling data according to claim 8, wherein the selective adjusting of each of the plurality of initial regions comprises
    selectively dividing the initial region into two or more intermediate regions or regions.

12. A method for obtaining modeling data according to claim 11, wherein the dividing is based on edges and/or areas.

13. A method for obtaining modeling data according to claim 1, wherein the obtaining of the 3D model of each of the plurality of components comprises:
    determining if the component corresponds to a component of a first type; and
    responsive to a positive determination, obtaining the 3D model of the component based on:
        a predetermined 3D model for the component of the first type; and
        one or more dimensions of the component obtained from the one or more 2D sections.

14. A method for obtaining modeling data according to claim 1, wherein the obtaining of the 3D model of each of the plurality of components comprises:
    converting the first 3D representation into an intermediate 3D model, wherein the intermediate 3D model corresponds to a mesh model.

15. A method for obtaining modeling data according to claim 14, wherein the obtaining of the 3D model of each of the plurality of components comprises:
    determining if the component corresponds to a component of a second type; and
    responsive to a positive determination, converting the intermediate 3D model to the 3D model of the component.

16. A method for obtaining modeling data according to claim 1, wherein the x-ray data is obtained using at least x-rays with an energy of about 9 MeV, and/or wherein the plurality of components in the object corresponds to at least 10,000 components.

17. A non-transitory computer-readable medium comprising a computer program for performing the method according to claim 1.

18. A non-transitory computer-readable medium comprising a data structure comprising the component-resolved 3D model of an the object obtained by performing a the method according to claim 1.

* * * * *